(12) United States Patent
Challita et al.

(10) Patent No.: US 12,149,418 B2
(45) Date of Patent: Nov. 19, 2024

(54) DATA COLLECTION IN DEFINED NETWORK OPERATING CONDITIONS IN RADIO ACCESS NETWORKS

(71) Applicant: Telefonaktiebolaget LM Ericsson (publ), Stockholm (SE)

(72) Inventors: Ursula Challita, Solna (SE); Pedro Batista, Sollentuna (SE); Eduardo Lins de Medeiros, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 388 days.

(21) Appl. No.: 17/632,635

(22) PCT Filed: Mar. 9, 2020

(86) PCT No.: PCT/SE2020/050251
§ 371 (c)(1),
(2) Date: Feb. 3, 2022

(87) PCT Pub. No.: WO2021/025603
PCT Pub. Date: Feb. 11, 2021

(65) Prior Publication Data
US 2022/0295317 A1    Sep. 15, 2022

(30) Foreign Application Priority Data

Aug. 6, 2019    (WO) ................. PCT/SE2019/050727

(51) Int. Cl.
*H04L 41/16* (2022.01)
*H04W 16/28* (2009.01)
(Continued)

(52) U.S. Cl.
CPC ............. *H04L 41/16* (2013.01); *H04W 16/28* (2013.01); *H04W 24/02* (2013.01); *H04W 24/08* (2013.01); *H04W 28/18* (2013.01)

(58) Field of Classification Search
CPC ..... H04W 24/00; H04W 24/02; H04W 24/04; H04W 24/08; H04W 24/10
See application file for complete search history.

(56) References Cited

U.S. PATENT DOCUMENTS 9,189,730 B1    11/2015    Coenen et al.
9,503,919 B2    11/2016    Sofuoglu et al.
(Continued)

FOREIGN PATENT DOCUMENTS

WO    WO-2016190789 A1 * 12/2016
WO    2018184666 A1    10/2018

OTHER PUBLICATIONS

International Search Report and Written Opinion of the International Searching Authority for PCT International Application No. PCT/SE2020/050251 dated Jul. 21, 2020.
(Continued)

*Primary Examiner* — Kevin Kim
(74) *Attorney, Agent, or Firm* — Sage Patent Group

(57) ABSTRACT

A computer implemented method performed by an application programming interface (APIR) for a network node in a radio access network is provided. The APIR for the network node can receive a request from a data processing entity to transition to a defined network operating condition in the radio access network. The APIR for the network node can further transition to the defined network operating condition during a defined time period. The APIR for the network node can further collect data during the defined time period including at least one observation of the defined network operating condition, an action in the radio access network during the defined network operating condition, and a subsequent observation of the radio access network based on the action. A method performed by a data processing entity is also provided.

20 Claims, 8 Drawing Sheets

(51) Int. Cl.
 *H04W 24/02* (2009.01)
 *H04W 24/08* (2009.01)
 *H04W 28/18* (2009.01)

(56) References Cited

U.S. PATENT DOCUMENTS

| | | |
|---|---|---|
| 10,225,772 B2 | 3/2019 | Gemelos et al. |
| 10,779,292 B2 | 9/2020 | Comsa et al. |
| 11,487,972 B2 | 11/2022 | Mase et al. |
| 11,514,347 B2 | 11/2022 | Dinh et al. |
| 11,616,813 B2 | 3/2023 | Van Seijen et al. |
| 2011/0106942 A1 | 5/2011 | Roskowski et al. |
| 2012/0307662 A1 | 12/2012 | Puolakka et al. |
| 2013/0208617 A1 | 8/2013 | Fukuta |
| 2014/0044002 A1 | 2/2014 | Fujishiro |
| 2016/0165462 A1 | 6/2016 | Tan et al. |
| 2018/0206136 A1 | 7/2018 | Chow et al. |
| 2019/0124667 A1 | 4/2019 | Comsa et al. |
| 2019/0138948 A1 | 5/2019 | Janulewicz et al. |
| 2019/0230046 A1 | 7/2019 | Djukic et al. |
| 2019/0239238 A1 | 8/2019 | Calabrese et al. |

OTHER PUBLICATIONS

ETSI TR 126 957 V15.0.0, "Universal Mobile Telecommunications System (UMTS); LTE; Study on Server and Network-assisted Dynamic Adaptive Streaming over HTTP (DASH) (SAND) for 3GPP multimedia services (3GPP TR 26.957 version 15.0.0 Release 15)," Jul. 2018, 54 pages.

Oh et al., "Energy Savings through Dynamic Base Station Switching in Cellular Wireless Access Networks," 2010 IEEE Global Telecommunications Conference GLOBECOM 2010, 5 pages.

Orsolic et al., "YouTube QoE Estimation Based on the Analysis of Encrypted Network Traffic Using Machine Learning," 2016 IEEE Globecom Workshops (GC Wkshps), 6 pages.

European Search Report for EP Patent Application No. 20849891.5, mailed Aug. 17, 2022, 4 pages.

European Search Report mailed Jul. 22, 2022 for European Patent Application No. 19940549.9, 4 pages.

Liang, Xuedong et al.; "A Multi-Agent Reinforcement Learning Based Routing Protocol for Wireless Sensor Networks"; IEEE International Symposium on Wireless Communication Systems; Piscataway, NJ; Oct. 21, 2008; 6 pages.

Calabrese, Francesco D. et al.; "Learning Radio Resource Management in 5G Networks: Framework, Opportunities and Challenges"; Cornell University Library; www.arxiv.org; Nov. 30, 2016; 17 pages.

International Search Report and Written Opinion of the International Searching Authority, PCT/SE2019/050727, mailed May 15, 2020, 12 pages.

Boutaba, Raouf et al., "A comprehensive survey on machine learning for networking: evolution, applications and research opportunities," Journal of Internet Services and Applications, vol. 9, No. 16, 2018, 99 pages.

\* cited by examiner

DATA COLLECTION IN DEFINED NETWORK OPERATING CONDITIONS IN RADIO ACCESS NETWORKS

RELATED APPLICATIONS

This application is a 35 U.S.C. § 371 national stage application of PCT International Application No. PCT/SE2020/050251 filed Mar. 9, 2020, which claims the benefit of PCT Application No. PCT/SE2019/050727 filed Aug. 6, 2019, the contents of which are hereby incorporated by reference herein.

TECHNICAL FIELD

The present disclosure relates generally to communications networks and, more particularly, to data collection in defined network operating conditions in radio access networks and related apparatuses.

BACKGROUND

A reinforcement learning (RL) agent may be trained online for some radio access network (RAN) applications. In some approaches, learning applications that benefit from observation of parameters/features that are close to the physical layer may be of interest.

RL agents may learn from interactive iteration with the RAN environment in which state, action, reward, next state pairs are collected. During a training with a number of iterations, an RL agent exposed to the environment is supposed to optimize or improve.

However, for radio processes, it can be very difficult to allow such training, as an RL agent can require a long time to understand states and relations between them. Thus, an RL agent may need to be pre-trained before being deployed. However, even with a pre-trained RL agent, the environment might change, and the RL agent may need to be continuously learning during online learning.

SUMMARY

In various embodiments of the present disclosure, a computer implemented method performed by an application programming interface for a network node in a radio access network is provided. The method includes receiving a request from a data processing node to transition to a defined network operating condition in the radio access network. The method further includes transitioning to the defined network operating condition during a defined time period. The method further includes collecting data during the defined time period including at least one observation of the defined network operating condition, an action in the radio access network during the defined network operating condition, and a subsequent observation of the radio access network based on the action.

In some embodiments, further operations performed by the application programming interface for a network node include an operator parameter that can be varied by an operator to alter an environment of the radio access network.

In some embodiments, further operations performed by the application programming interface for a network node include signaling a request to a network monitoring node for the defined time period to transition to the defined network operating condition. The operations further include receiving authorization from the network monitoring node to transition to the defined network operating condition for the defined time period. The operations further include notifying the data processing node of the defined time period during which the transition to the defined network operating condition will occur.

In some embodiments, further operations performed by the application programming interface for a network node include providing the data collected during the defined time period to the data processing entity.

In some embodiments, further operations performed by the application programming interface for a network node include identifying network operating conditions during which the defined network operating condition can be generated without substantially degrading a quality of experience of a communication device.

In some embodiments, further operations performed by the application programming interface for a network node include receiving signaling from a network orchestrator that the defined network operating condition can be visited.

Corresponding embodiments of inventive concepts for an application programming interface for a network node, computer products, and computer programs are also provided.

In other embodiments of the present disclosure, a computer implemented method performed by a data processing entity for a network node in a radio access network is provided. The method includes identifying a defined network operating condition. The method further includes signaling a request to an application programming interface for a network node to transition to a defined network operating condition in the radio access network. The method further includes receiving data collected during a defined time period via the application programming interface of the network node.

In some embodiments, further operations performed by the data processing node for a network node include learning from the data collected during the defined time period to predict the defined network operating condition.

Corresponding embodiments of inventive concepts for a data processing entity for a network node, computer products, and computer programs are also provided.

In some approaches, collected data for offline training of an RL agent may not capture some network states that the RL agent may encounter once deployed in real networks. Moreover, in both pre-training and online learning, an RL agent may be exposed to an imbalanced dataset such that the RL agent has little exposure to some scenarios and may perform poorly once the RL agent experiences those scenarios. Exposing the RL agent to those scenarios, however, may disrupt experiences of existing user traffic or operations of a cell.

Various embodiments of the present disclosure may provide solutions to these and other potential problems. In various embodiments of the present disclosure, a radio access network can be altered during a defined time period by transitioning to a defined network operating condition (e.g., to a high load state based on artificial data (also referred to herein as dummy data)). A RL agent can explore and data can be collected during the defined time period. As a consequence, the RL agent can explore the defined network operating condition, which may improve learning speed of the RL agent and may improve quality of experience for end users.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
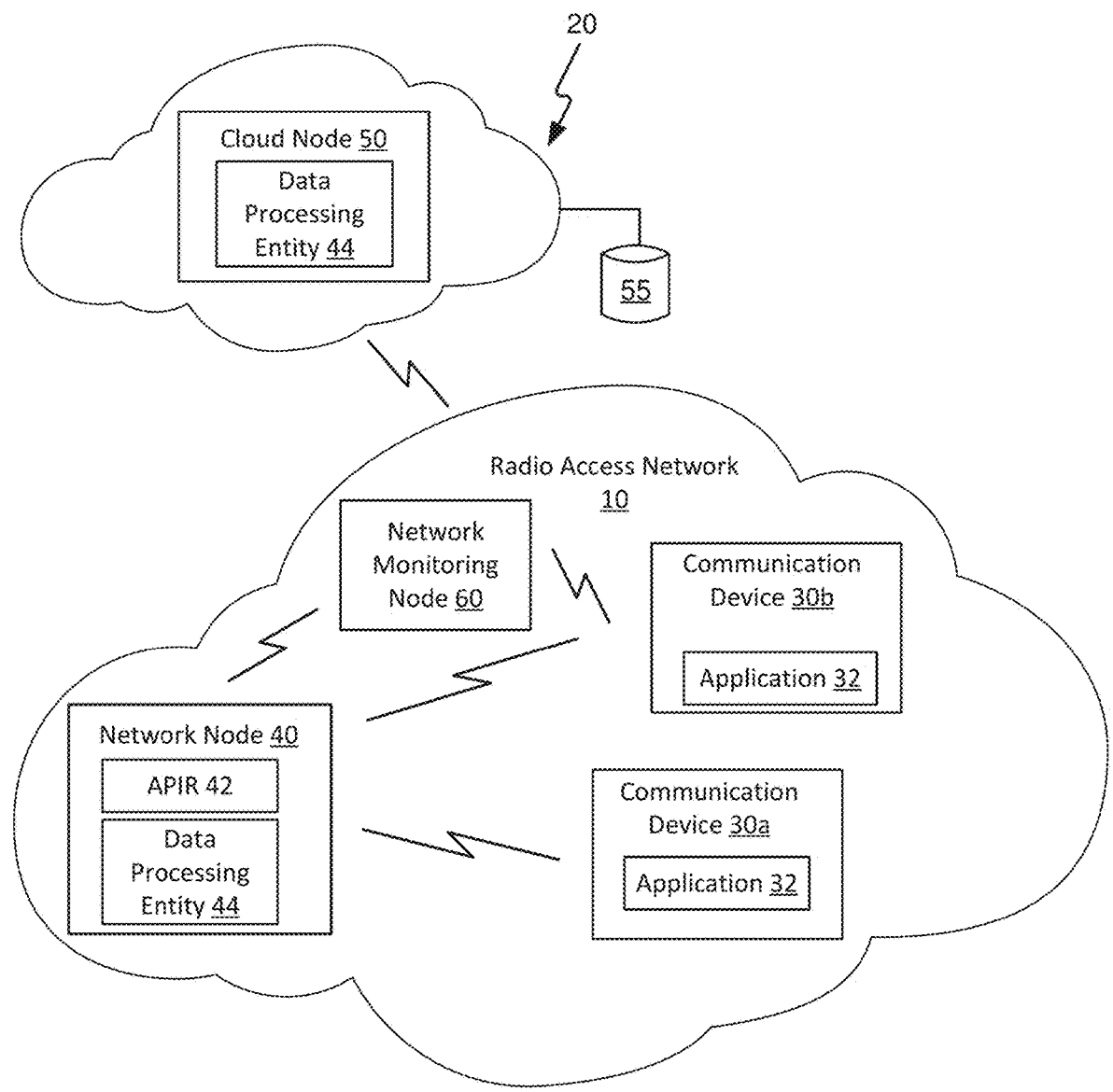
FIG. 1 is a diagram of a radio access network having components configured in accordance with various embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "application programming interface for a network node" is used in a non-limiting manner and, as explained below, can refer to any type of application programming interface for a network node in a RAN. The term "application programming interface" herein may be interchangeable and replaced with the term "APIR". As used herein, network node refers to equipment capable, configured, arranged and/or operable to communicate directly or indirectly with a communication device and/or with other network nodes or equipment in the radio access network or communicatively coupled to a RAN. Examples of network nodes include, but are not limited to, a network node in a RAN or in a cloud environment communicatively coupled to a RAN, etc. More generally, however, an APIR for a network node may represent any suitable device (or group of devices) capable, configured, arranged, and/or operable by the network node that is exposed to a data processing entity.

Further, the term "data processing entity" (DPE) is used in a non-limiting manner and, as explained below, can refer to any type of data processing entity such as a RL agent, a machine learning (ML) agent, etc. Unless otherwise noted, the term DPE may be used interchangeably herein with RL agent.

The following explanation of potential problems is a present realization as part of the present disclosure and is not to be construed as previously known by others. In some approaches, collected data for offline training of an RL agent may not capture some network states that the RL agent may encounter once deployed in real networks. Moreover, in both pre-training and online learning, an RL agent may be exposed to an imbalanced dataset. That is, for example, since most cells spend a considerable amount of time in low-load states (as opposed to peak demand), datasets of such observations will inherit this imbalance. For a RL agent, the imbalance may mean that the RL agent has little exposure to high load scenarios and may perform poorly once the RL agent experiences these cases.

It may be desirable to enable online training of an RL agent, and to expose the RL agent to such situations (e.g., states) that a network may experience with the least impact on existing users or normal operation of a cell. That is, it may be desirable for existing user traffic to be disrupted as little as possible.

Various embodiments of the present disclosure may provide solutions to these and other potential problems. In various embodiments of the present disclosure, a radio access network can be altered during a defined time period by transitioning to a defined network operating condition (e.g., to a high load state based on artificial data). A RL agent can explore and data can be collected during the defined time period. As a consequence, the RL agent can explore the defined network operating condition, which may improve learning speed of the RL agent and may improve quality of experience for end users.

In various embodiments of the present disclosure, an APIR and a DPE may be provided to allow network-aided safe generation of situations (e.g., states) in a RL application related to a RAN. Some embodiments of the present disclosure detect less frequently visited states in a RAN-related RL application.

Although such sates are less frequent, less frequent states may be as important as (or more important than) other states because, in real environments, such states reveal themselves in the moment in which the network may be more fragile and optimization or improvement is more important (e.g., in high load).

In various embodiments of the present disclosure, an RL agent may transition more frequently to such states in a seamless manner. This can be achieved with an APIR that enables these transitions. Additionally, the transitions can be made without degrading overall quality of experience (QoE).

Potential advantages provided by various embodiments of the present disclosure may include one or more of the following:

Online RL agent updating;

Exposing an RL agent to a more uniform dataset (e.g., having a similar state transition probability);

Exposing an RL agent to vulnerable situations before they happen (e.g., high load) without substantially degrading user QoE;

Improving online learning where an agent could experience unseen network states;

Improving speed of a learning process, e.g., faster optimized or improved response to new states in real environments;

Adaptive to highly dynamic changes in the environment; and

Improved overall QoE for end users

FIG. 1 is a diagram of a radio access network 10 and a cloud network 20 having components configured in accordance with various embodiments of inventive concepts. Radio access network 10 includes communication devices 30a and 30b that each include an application 32. Radio access network 10 further includes network node 40, which includes APIR 42 and DPE 44, and network monitoring node (NMC) 60. Alternatively, DPE 44 may be located in cloud node 50 of cloud network 20. Cloud node 50 is communicatively connected to radio access network 10. Database 55 may be communicatively connected to cloud node 50, including DPE 44.

In various embodiments of the present disclosure, a method for a RL agent to learn on-line and obtain data is provided. The data can include high-quality (e.g., diverse) experience (e.g., trajectory) data. As described above, potential problems with data for training a RL agent may include the following. Data for training a RL agent could be provided by third-party entities or operators of the radio access network. However, this data may not account for enough possible real network conditions. As such, it may be important to collect data according to uncontrollable components (e.g., from a live network/users), thus, generating data (e.g., highly valuable data) that can result in better inference (e.g., prediction) accuracy. Nonetheless, even this live data may be highly unbalanced. For example, most of the collected data could be collected at low load scenarios. Various embodiments of the present disclosure may provide solutions to these and other potential problems. For example, some embodiments of the present disclosure enable on-line network modifications to create less common network conditions by altering the environment without substantially degrading a user's perceived quality of experience (QoE). As a consequence, data balance may be improved and a RL agent may learn how to optimize or improve the environment under such scenarios before they happen in real networks.

Figure 2:
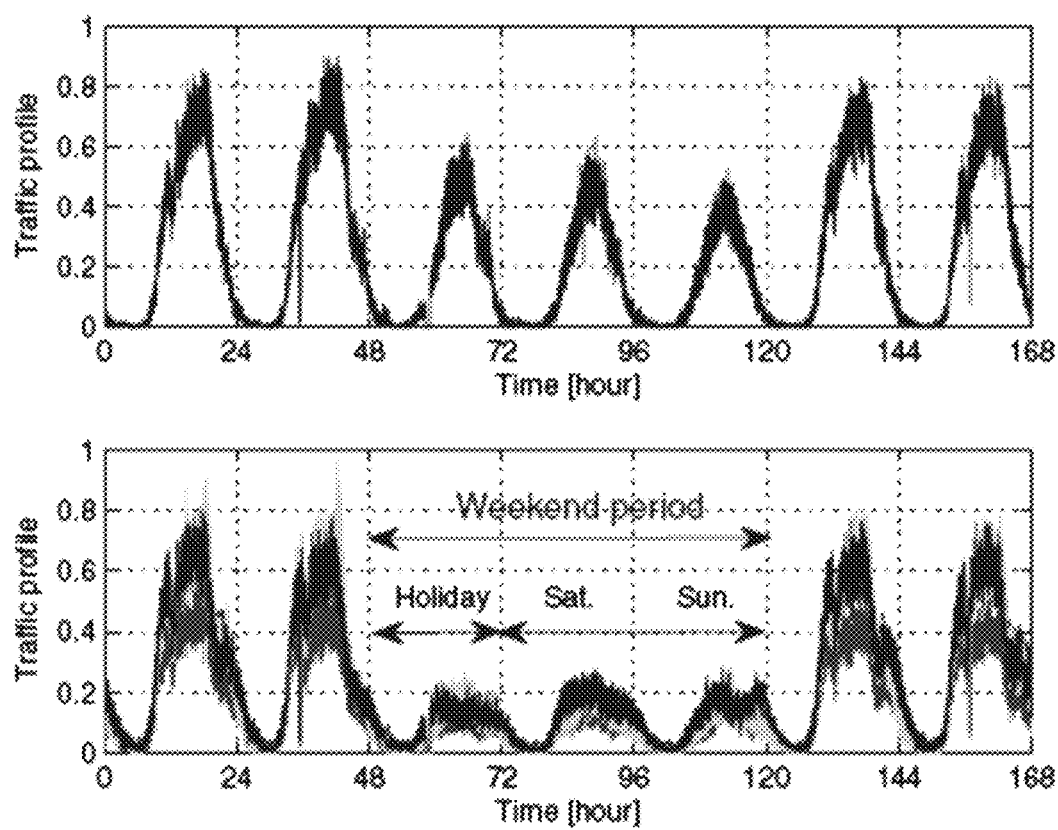
FIG. 2 is a normalized traffic profile of a central base station (top) and four neighboring bases stations (bottom) for one week.

In various embodiments of the present disclosure, a RL agent can be trained on-line. Real networks operate most of the time at a load/utilization level within a specific range, as illustrated in FIG. 2. FIG. 2 is a normalized traffic profile of a central base station (top) and four neighboring bases stations (bottom) for one week. See e.g., Oh E, Krishnamachari B: Energy savings through dynamic base station switching in cellular wireless access networks. Global Telecommunications Conference (GLOBECOM 2010), IEEE, pp. 1-5, Miami, 6-10 Dec. 2010. For example, in a case of mobile broadband (MBB) traffic, base stations typically may operate below 60% utilization level for at least two thirds of the time, as illustrated in FIG. 2.

A RL agent trained on such scenarios can have unbalanced data and when exposed to the less frequent situations (e.g., full utilization), the RL agent may perform poorly.

Various embodiments of the present disclosure include processes for artificially creating less-seldom visited network states (e.g., high load scenarios based on adding artificial traffic). As a consequence, prediction accuracy may be improved in real deployments (e.g., adding artificial traffic exposes a RL agent to such high-load situations).

It is noted that data generated in some embodiments of the present disclosure may be more valuable than data created based on only using artificial users to load the network because, in some embodiments, only part of the data is synthetic and because the data is generated in a real network. Thus, there is a natural component which may generate high-valuable data. In contrast, only artificial data may not account for some situations and may not account for conditions changing.

Another potential problem, however, may be that loading the real network environment may degrade the QoE of existing users. Thus, some embodiments of the present disclosure, identify less frequently visited network states in a dataset (e.g., a training dataset), identify how a RL agent can make a transition to those states, and under what network conditions those transitions can be made without substantially degrading an overall QoE. For example, in a low-load scenario where users have a buffer that is full, the users can tolerate, for a finite period, a degraded or poor QoS imposed by artificially added traffic without substantially degrading the users' respective QoE.

Figure 3:
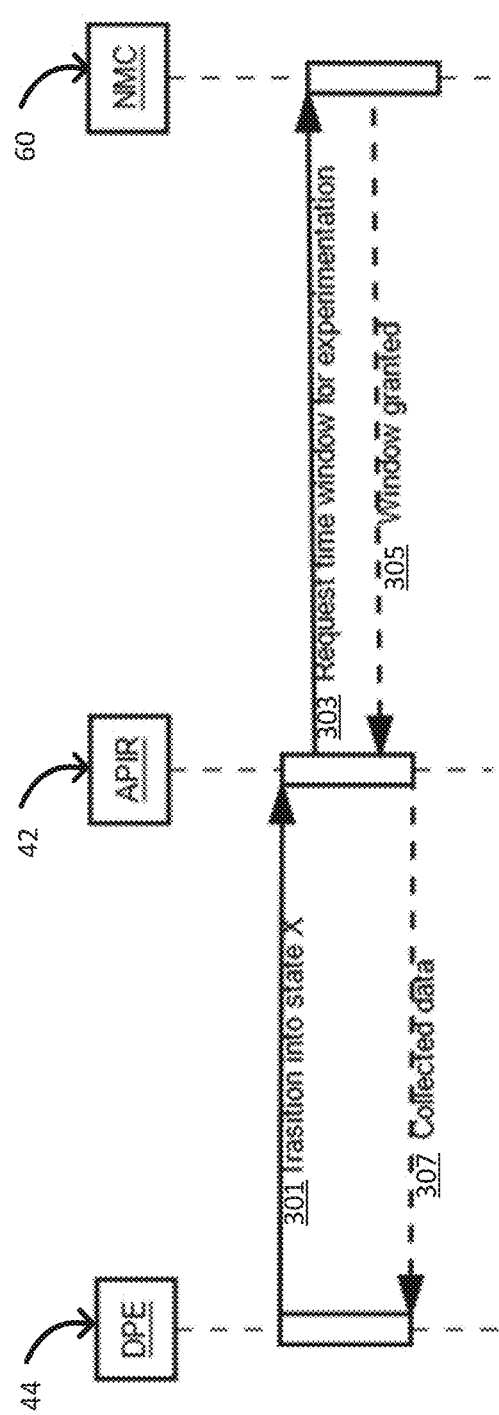
FIG. 3 is a schematic diagram illustrating exemplary components and signalling in accordance with various embodiments of the present disclosure.

FIG. 3 is a schematic diagram illustrating components and signalling in accordance with various embodiments of the present disclosure. Referring to FIG. 3, a radio access network includes a network node that exposes APIR 42, DPE 44, and NMC 60. In an exemplary embodiment, DPE 44 decides which states are of interest to be sampled. At operation 301, DPE 44 contacts APIR 42 to request a transition into those states. At operation 303, APIR 42 requests that NMC 60 decide an appropriate time window for such a state visit. Once NMC 60 identifies such a time window, at operation 305, APIR 42 is notified. At operating 307, APIR 42 transitions into such a state, and signals the end of the experiment and collected data to DPE 44.

Various embodiments of the present disclosure can include the following:

An APIR (e.g., APIR 42) exposed by a network node (e.g., network nodes 40) towards a DPE 44. DPE 44 includes a RL agent. DPE 44 can be located at a base station level (e.g., network node 40) or in the cloud (e.g., cloud node 50). In various embodiments, the APIR allows the DPE to suggest transitions to states that the DPE wants to have more samples of (e.g., uncommon or less frequently observed states).

In some embodiments, the APIR notifies the DPE about when these transitions are executed, and requests can be delayed based on network conditions, such as high load, prioritized UE classes in the system.

A NMC (e.g., NMC 60) may be provided that includes a role of identifying times at which transitions to the states of interest can be made without substantially degrading the QoE.

A component can also be included to detect which states need more samples. This component can be part of the DPE (e.g., DPE 44).

A network node (e.g. network node 40) can also detect suitable network operating conditions, prior to transitioning into the states of interest.

Figure 4A:
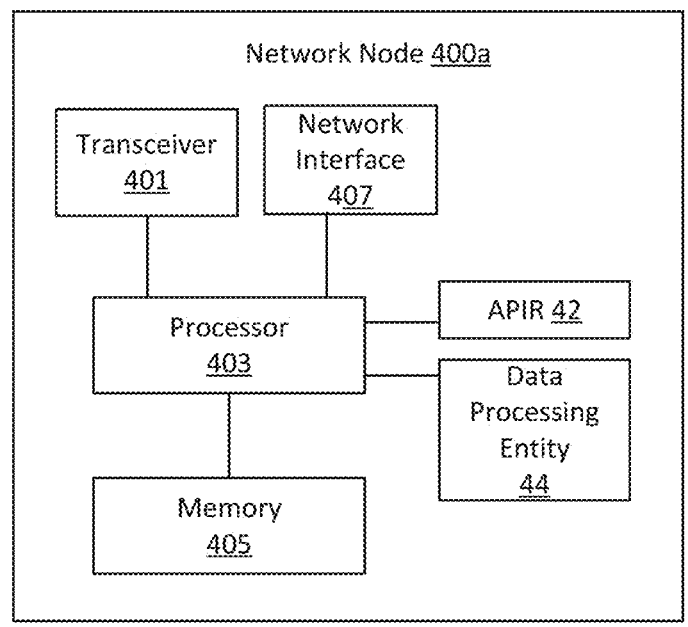
FIGS. 4a and 4b are block diagrams of elements of a network node in accordance with various embodiments of the present disclosure.

FIG. 4a is a block diagram illustrating a network node 400a (e.g., network node 40 in FIG. 1). The network node 400a includes network interface 407 (e.g., wired network interface and/or wireless network interface) configured to communicate with other nodes of the radio access network. The network node 400a may be configured as a radio network node containing a RF front-end and/or a light signaling front-end with transceiver 401. The network node also includes processor circuit 403 (also referred to herein as a processor), coupled to the network interface 407, and a memory circuit 405 (also referred to as memory) coupled to processor 403. The memory 405 stores computer readable program code that when executed by the processor 403 causes the processor to perform operations according to embodiments disclosed herein. According to other embodiments, processor 403 may be defined to include memory so that a separate memory is not required. The network node also includes APIR 42 coupled to processor 403, and data processing entity 44 coupled to processor 403. The APIR 42 stores computer readable program code, or is communicatively connected to a memory storing computer readable program code, that when executed by the APIR 42 causes the APIR 42 to perform operations according to embodiments disclosed herein. The data processing entity 44 stores computer readable program code, or is communicatively connected to a memory storing computer readable program code, that when executed by the data processing entity 44 causes the data processing entity 44 to perform operations according to embodiments disclosed herein.

Figure 4B:
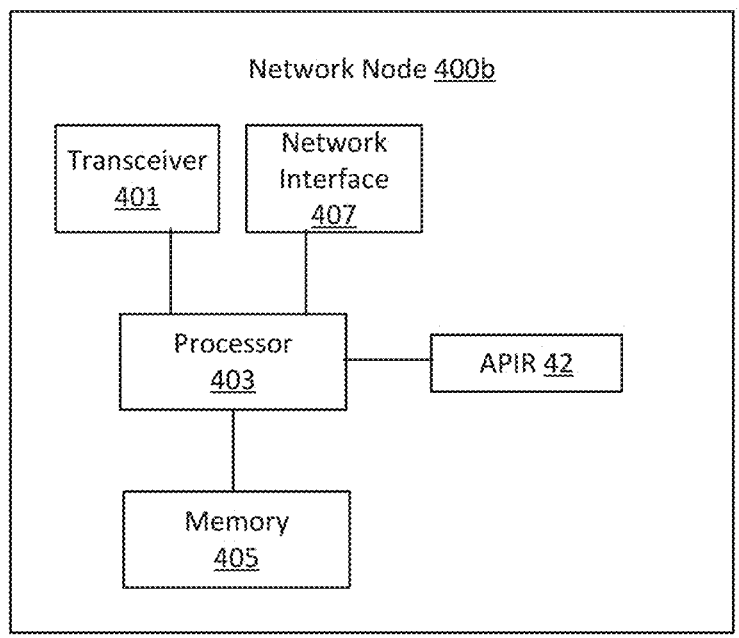

Alternatively, a network node can be as illustrated in FIG. 4b without data processing entity 44. FIG. 4b is a block diagram illustrating a network node 400b (e.g., network node 40 in FIG. 1). The network node 400b includes network interface 407 (e.g., wired network interface and/or wireless network interface) configured to communicate with other nodes of the radio access network. The network node 400b may be configured as a radio network node containing a RF front-end and/or a light signaling front-end with transceiver 401. The network node also includes processor circuit 403 (also referred to herein as a processor), coupled to the network interface 407, and a memory circuit 405 (also referred to as memory) coupled to processor 403. The memory 405 stores computer readable program code that when executed by the processor 403 causes the processor to perform operations according to embodiments disclosed herein. According to other embodiments, processor 403 may be defined to include memory so that a separate memory is not required. The network node also includes APIR 42 coupled to processor 403. The APIR 42 stores computer readable program code, or is communicatively connected to a memory storing computer readable program code, that when executed by the APIR 42 causes the APIR 42 to perform operations according to embodiments disclosed herein.

Figure 5:
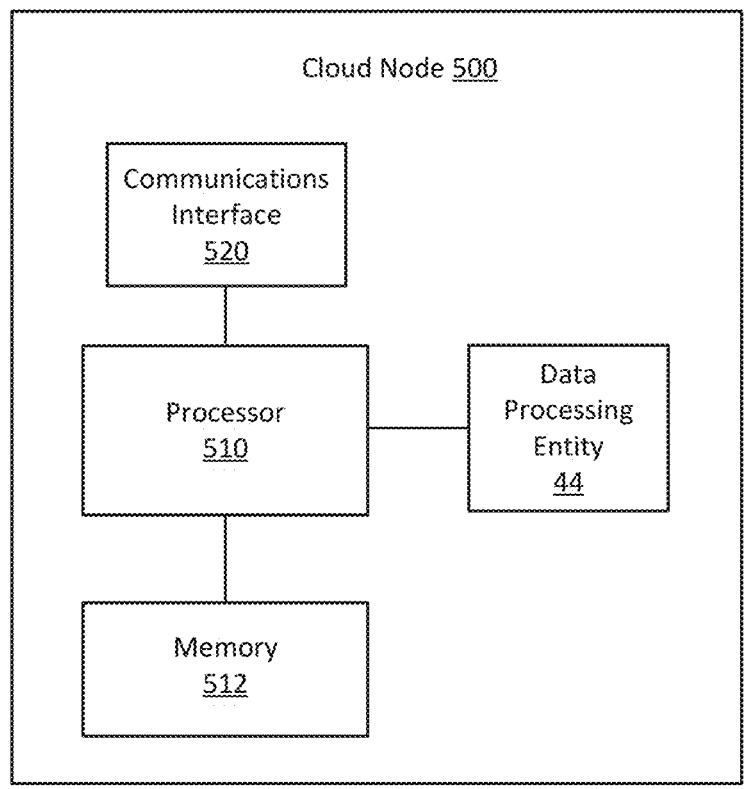
FIG. 5 is a block diagram of elements of a cloud network node in accordance with various embodiments of the present disclosure.

When the network node is configured without data processing entity, the data processing entity can be located at a cloud node (e.g., cloud node 50 in FIG. 1). FIG. 5 is a block diagram illustrating a cloud node 500. The cloud node 500 includes communication interface 520 (e.g., wired network interface and/or wireless network interface) configured to communicate with other nodes of the radio access network. The cloud node also includes processor circuit 510 (also referred to herein as a processor), coupled to the communication interface 520, and a memory circuit 512 (also referred to as memory) coupled to processor 510. The memory 512 stores computer readable program code that when executed by the processor 510 causes the processor to perform operations according to embodiments disclosed herein. According to other embodiments, processor 510 may be defined to include memory so that a separate memory is not required. The cloud node also data processing entity 44 coupled to processor 403. The data processing entity 44 stores computer readable program code, or is communicatively connected to a memory storing computer readable program code, that when executed by the data processing entity 44 causes the data processing entity 44 to perform operations according to embodiments disclosed herein.

Figure 6:
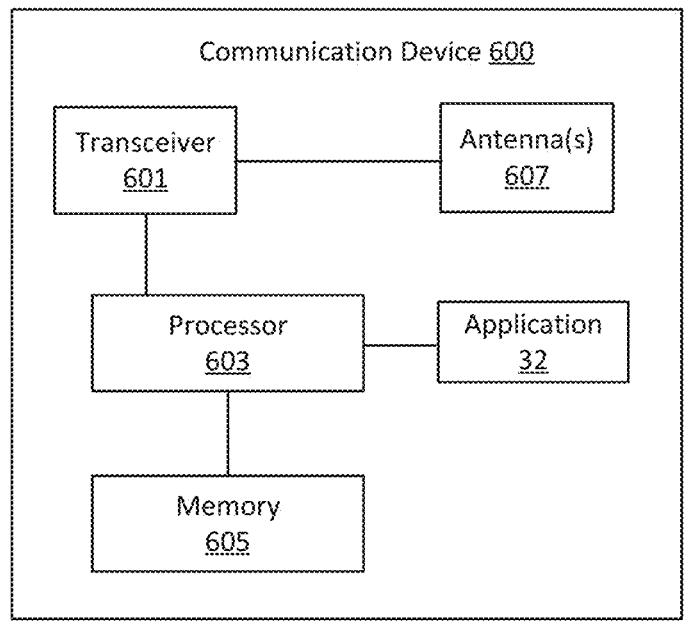
FIG. 6 is a block diagram of elements of a communication device in accordance with various embodiments of the present disclosure.

FIG. 6 is a block diagram illustrating a communication device 600 (e.g., communications devices 30a, 30b in FIG. 1) that is configured according to some embodiments. The communication device 600 includes a transceiver 601 and antenna(s) 607 to provide uplink and downlink radio communications with a radio network node (e.g., a base station, eNB, gNB, etc.) of a radio access network. Communication device 600 further includes a processor circuit 603 (also referred to as a processor) coupled to a memory circuit 605 (also referred to as memory). The memory 605 stores computer readable program code that when executed by the processor 603 causes the processor 603 to perform operations according to embodiments disclosed herein. Communication device 600 further includes application 32 coupled to processor 603.

In some embodiments of the present disclosure, a method for a network node component (e.g., APIR 42) induces a desired state, while preserving QoE for active users.

Data collection in accordance with various embodiments of the present disclosure is now described further.

Operations performed in accordance with various embodiments of the present disclosure may include, without limitation:

A first operation can include identifying less frequently visited network states in the environment. The first operation can be part of a RL agent application implementation (e.g., DPE 44).

For example, a histogram can be built for simple examples/datasets where the network state is characterized by a relatively small number of features. The state transitional probability can also give insights on the frequency that each state is visited.

In another example, for more complicated state definitions and datasets, anomaly detection techniques can be used for identifying less frequently visited network states in the underlying dataset.

Exemplary embodiments of the first operation are now described.

In a first exemplary embodiment, a DPE (e.g., DPE 44) can detect that its data only contains low spectral utilization (e.g., 10% or 20%), consistent usage of low MCS (e.g., BPSK or QPSK), parts of the channel that are unused, and/or beams or transmission modes that were not observed. DPE 44 can request the counter part of such data to improve the coverage of its dataset, e.g., request higher spectral utilization states, higher MCS, etc.

In a second exemplary embodiment, the DPE (e.g., DPE 44) can use domain/expert knowledge from other deployments, e.g., the network operator can base its knowledge on the required frequency of state visits for each state based on similar deployments at other geographical areas. For instance, a histogram representing the frequency of visits for specific states can be used but instead of targeting a uniform distribution (equal number of visits to each state), the histogram can replicate what the expert knows about the network (e.g., having more samples of bad channel conditions, which are less predictable than good channel conditions).

In a third exemplary embodiment, the DPE (e.g., DPE 44) can also compute confidence intervals on the estimate of the its target function of each state (e.g., value function for reinforcement learning). Thus, aiding the dataset of the DPE to visit states having a large confidence interval such that estimation may not be good. Various techniques can be used to compute confidence levels, such as an example described in M. White and A. White, "Interval Estimation for Reinforcement-Learning Algorithms in Continuous-State Domains".

A second operation can include identifying network conditions during which less frequently visited states can be visited that may not substantially degrading users' QoE.

For example, a RL agent that optimizes or improves low-level network controllers may be of particular interest. Low-level network controllers can operate in a high timescale, much greater than a high-level application layer time scale. For example, one application may be a decision of which modulation code scheme (MCS) to use for a particular user (link adaptation problem). This decision may be taken in microseconds, while the high-level video streaming buffers can be operating in tenths of seconds. Thus, this allows identification of time periods at which the low-level controller may offer a degraded or performance which may not be visible at the high-level side.

Session/application-level metric collection and QoE estimation can be done in multiple ways, depending on the network type and applications. Examples of such an enabler is now described.

An example is provided for a video streaming use-case.

In a video streaming example, a user (e.g., communication device $30a$) has two processes. A first process is downloading video segments and storing the video segments in a buffer (e.g., a buffer of communication device $30a$). A second process is consuming segments from the buffer to display to the user. An average rate c from which segments are consumed from the buffer is fixed, as a function of the video itself; an average rate of insertion i into the buffer, on the other hand, is a function of the network condition. Thus, the best quality of experience (QoE) is achieved if the network can provide i≥c, accordingly, increasing or maintaining the buffer level s (seconds). In good, and desirable, network conditions i>>c and the buffer fills up to its maximum size r (usually tenths of seconds).

Therefore, if s≥0, RL exploration may be allowed for at least s seconds without substantial QoE degradation, as long as i≥c after the exploration period.

A potential challenge then may be how the RL agent can know s. At least two potential methods can be used: application assisted, when there exists a communication channel between the RL agent and the video streaming application. Hence s can be directly informed to the RL agent; and/or stand-alone, if there is no such communication. Consequently s must be estimated.

For the application assisted method, 3GPP has been studying such a network application communication channel. One example is in 3GPP TR 26.957, "Study on Server and Network-assisted Dynamic Adaptive Streaming over HTTP (DASH) (SAND) for 3GPP multimedia services," 3GPP TR 26.957, March 2017. Through the use of machine learning, the perceived user QoE and buffer status can also be estimated, with techniques such as I. Orsolic, D. Pevec, M. Suznjevic, and L. Skorin-Kapov, "YouTube QoE Estimation Based on the Analysis of Encrypted Network Traffic Using Machine Learning," in 2016 IEEE Globecom Workshops (GC Wkshps), 2016, pp. 1-6, thus enabling the stand-along method.

With the use of emerging automated networks, such as an envisioned zero touch network management, there may be also a communication channel from the network orchestrator. Thus, a network assisted method may also be provided. For example, an orchestrator, which has access to the full network status, can determine when the QoE/service level agreement (SLA) for end-users is good or bad enough and signals the RL agent to allow controlled user connectivity degradation. For example, in the Open Network Automation Platform (ONAP), the Ericsson Adaptive Policy eXecution Engine (APEX) and CENX Service Assurance can detect bad network conditions and if the root cause of the problem is not the RL controlled system, the degradation is allowed. Similarly, degradation in good network conditions can also be enabled by such a coordination.

A fully stand-alone method can also be provided. For example, for some applications (e.g., delay tolerant large file transfer) it is safe to assume that if the RLC buffer is not full, lower layers performance can be tolerated, as long as the buffer does not fill up and packages have to be dropped.

Exemplary embodiments of a network assisted method is now described.

In a first exemplary embodiment, if server and network-assisted DASH (SAND) (see e.g., 3GPP, "Study on Server and Network-assisted Dynamic Adaptive Streaming over HTTP (DASH) (SAND) for 3GPP multimedia services," 3GPP TR 26.957, March 2017) is available, the buffer status on the clients is available to the network. In other words, it is informed from the OTT/client to the DASH-aware network element (DANE). Thus, as discussed above, each user can suffer a degradation with the duration of its buffered content.

In a second exemplary embodiment, if SAND is not available, a deep neural network can be trained to infer the buffer level of each user using network performance counters (packet headers, packet sizes, queue sizes, etc.). See e.g., I. Orsolic, D. Pevec, M. Suznjevic, and L. Skorin-Kapov, "YouTube QoE Estimation Based on the Analysis of Encrypted Network Traffic Using Machine Learning," in 2016 IEEE Globecom Workshops (GC Wkshps), 2016, pp. 1-6.

In a third exemplary embodiment, another metric which indicates user resilience to network degradation is the occupancy of the RLC buffer. For example, when the RLC buffer is empty (or has low utilization, such as 10% utilization or less).

In a fourth exemplary embodiment, a network orchestrator (e.g. NMC 60), with additional visibility of the network and its goals, may signal that the states can be visited even if it causes degradation in the user performance. One motivation for such a case may be a young network (e.g., recently deployed) when it might be more important to visit the states and acquire experience than provide a reliable service.

A third operation can include defining how the environment can transition into less visited states.

For example, the APIR (e.g., APIR 42) and the network nodes (e.g. baseband, radio nodes) can interact to "visit" the state required by the client machine learning application (e.g., RL application in DPE 44). To "visit" a required state, the APIR may request a change of specific configuration parameters in the network nodes (e.g. baseband or radio nodes), or the execution of certain procedures that trigger a change in behavior or conditions experienced by UEs and network.

Exemplary embodiments of the third operation are now described.

In a first exemplary embodiment, the APIR (e.g., APIR 42) requests that a baseband node inject dummy traffic at low traffic scenarios. This triggers a change from a low-load state to a high load state.

In a second exemplary embodiment, the APIR (e.g., APIR 42) instructs a baseband node to decrease traffic load at high load scenarios. The change in state is achieved by the baseband node dropping packets from a buffer or set of buffers (e.g. RLC buffers).

In a third exemplary embodiment, the APIR (e.g., APIR 42) instructs a radio node to increase or decrease power level (e.g. amplifier gain) for varying the signal to noise ratio (SNR) experienced by a certain user. This can enable changes from a low to high SNR state.

In a fourth exemplary embodiment, the APIR (e.g., APIR 42) instructs a baseband and radio nodes to execute a procedure where controlled amounts of distortion are added at the transmitter in order to degrade the quality of pilots (reference signals) sent to a subset of UEs. This enables changes from a state of good channel knowledge to a state of imperfect channel state knowledge at the UEs.

In a fifth exemplary embodiment, the APIR (e.g., APIR 42) instructs a baseband node to trigger the generation of controlled interference using multi-user multiple input multiple output (MU-MIMO) scheduling. Thus, the baseband may intentionally schedule a set of UEs to the same time, frequency or space resources, so that those transmissions interfere with one another. This might enable the change from a low interference to a high interference state for a subset of UEs.

Various embodiments of the present disclosure can be adopted at different network levels such as the physical layer or at the packet level.

An example in accordance with various embodiments is now described for link adaption.

In an exemplary embodiment, a RL agent (e.g., DPE 44) performs link adaption. Thus, the RL agent observes UE channel conditions and decides which MCS to use. A feature for performing link adaptation is the physical environment around the base station, e.g., buildings, foliage and movement will create specific channel characteristics for each UE. Furthermore, link adaptation may be driven by channel quality information (CQI) reports sent by UEs, or equivalently pilot symbols. In high-load scenarios, a scheduler must decide between using spectrum for data or signaling (e.g., UE reports, pilots), which may lead to longer intervals between reports and MCS decisions. This, in turn, may tend to cause the scheduler to decide conservative MCS choices (e.g., robust coding). Thus, it may be impracticable to model the exact location of each base station, which makes this a good environment for online RL learning.

Figure 7:
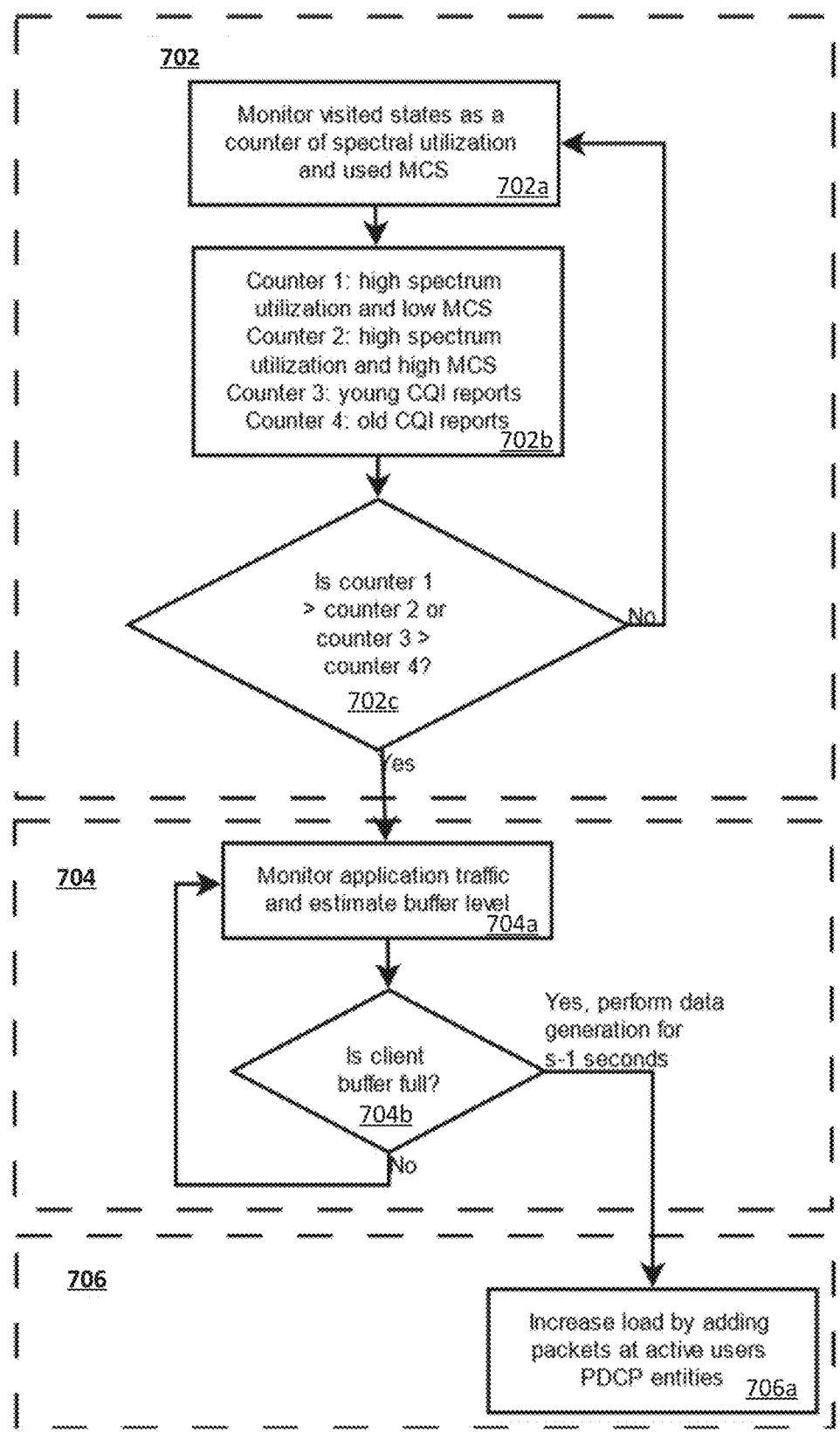
FIG. 7 is a diagram illustrating data generation to produce dummy data in an exemplary embodiment for performing link adaption in accordance with various embodiments of inventive concepts.

FIG. 7 is a diagram illustrating data generation to produce dummy data in an exemplary embodiment for performing link adaption in accordance with various embodiments of inventive concepts. Referring to FIG. 7, at operation 702, during each training interaction a RL agent (e.g., DPE 44) can keep a count of the visited network states. In low-load scenarios, the RL agent may decide for low MCS, since it is more robust to channel impairments than high ones. However, low MCS may occupy more spectrum, which may a scare resource in (e.g., rare) high-load scenarios. Thus, it may be desirable to expose the RL agent to high-load scenario so that the RL agent learns faster an optimal or improved MCS configuration. It is noted that another data imbalance that may be important is the MCS and the CQI report age. As discussed above, high load scenarios may lead to old CQI reports.

During operation 702 at block 702a, the RL agent (e.g., DPE 44) monitors visited states as a counter of spectral utilization and used MCS. At block 702b, four counters monitor visited states as follows: Counter 1 monitors high spectrum utilization and low MCS. Counter 2 monitors high spectrum utilization and high MCS. Counter 3 monitors young CQI reports. Counter 4 monitors old CQI reports. At block 702c, the RL agent determines whether Counter 1>Counter 2 or Counter 3>Counter 4. If no, then the RL agent continues to monitor visited states as shown in block 702a. If yes, operation 704 is performed.

Referring to operation 704 of FIG. 7, to increase the load at the physical layer scheduler, where the link adaptation lives, IP layer packets at the PDCP entity of the existing UE associated to the base station can be introduced. Those packets can be queued and sent to the UE, where they can be automatically discarded because they were not requested. However, from a physical layer point of view, the packets were transmitted normally and increased the load, as a normal packet would have done. During operation 704 at block 704a, an APIR (e.g., APIR 42) monitors application traffic and estimates a buffer level.

At operation 706, clients are using video streaming applications, and the network knows the buffer status in the UE. A network node (e.g., network node 40) performs dummy data generation when the buffers are full. That is, the network increases load by adding packets at active users PDCP entities, as described above.

In another exemplary embodiment, a RL agent (e.g., DPE 44) may need to decrease the noise level in order to increase the frequency of visiting some other network states. For example, this can be performed by discarding some of the traffic packets or increasing the transmission power level. It is noted that this approach may be of interest to highly loaded network environment scenarios, such as highly dense urban areas or busy airports where very low loaded scenarios are visited less frequently. Similarly, the RL agent can alter the observed radio environment when the QoE/SLA for end-users is good or bad enough or in case of low latency applications.

In another exemplary embodiment, an operator can set up a parameter for adjusting behavior based on the dynamics of each environment. For example, it may not always be of interest to achieve a uniform state visit. For instance, in a case of rural or unpopulated neighborhoods, the traffic load is less likely to reach a very high level and the base station utilization level might never peak. In such scenarios, it may not be of interest to the operator to achieve a uniform state visits or learning an optimal or improved action under such states can be achieved at a lower learning rate. As such, an operator can adjust the level at which the base station alters the real radio environment by tuning a specific parameter thus defining the speed at which the optimal or improved action for each possible network state is learned. For example, tuning such behavior can be achieved by defining the required probability of network state visits for each state.

In various embodiments of the present disclosure, various aspects of a RAN node that operate in a small timescale (milliseconds) are potentially optimized by artificial intelligence, including RL. For example, the link adaptation example discussed above. Further, the QoE of many applications may be dependent on a higher timescale (minutes), e.g., DASH. Thus, a window in the QoE timescale (seconds of buffers in DASH) may represent many actions on the RAN node timescale (link adaptation decisions taken every millisecond), which could potentially generate useful data.

Various embodiments of the present disclosure may enable on-line network modifications to create less common network conditions by altering the environment without degrading the perceived user QoS. This may result in improving data balance and allowing the agent to learn how to optimize the environment under such scenarios before they happen in real networks.

In various embodiments of the present disclosure, a method is provided that may improve an outcome of reinforcement learning techniques when applied to data driven applications in cellular networks. In some embodiments, the method may alter the radio network environment, in a near seamless way to the connected devices, such that the RL agent can explore more often less frequently visited states thus increasing the learning speed of the RL agent and improving overall QoE for the end users. This can be performed by various operations including, without limitation, by injecting dummy traffic or increasing/decreasing transmission power level.

These and other related operations will now be described in the context of the operational flowcharts of FIGS. 8 and 9 that are performed by an APIR for a network node and a DPE for a network node, respectively. Each of the operations described in FIGS. 8 and 9 can be combined and/or omitted in any combination with each other, and it is contemplated that all such combinations fall within the spirit and scope of this disclosure.

Figure 8:
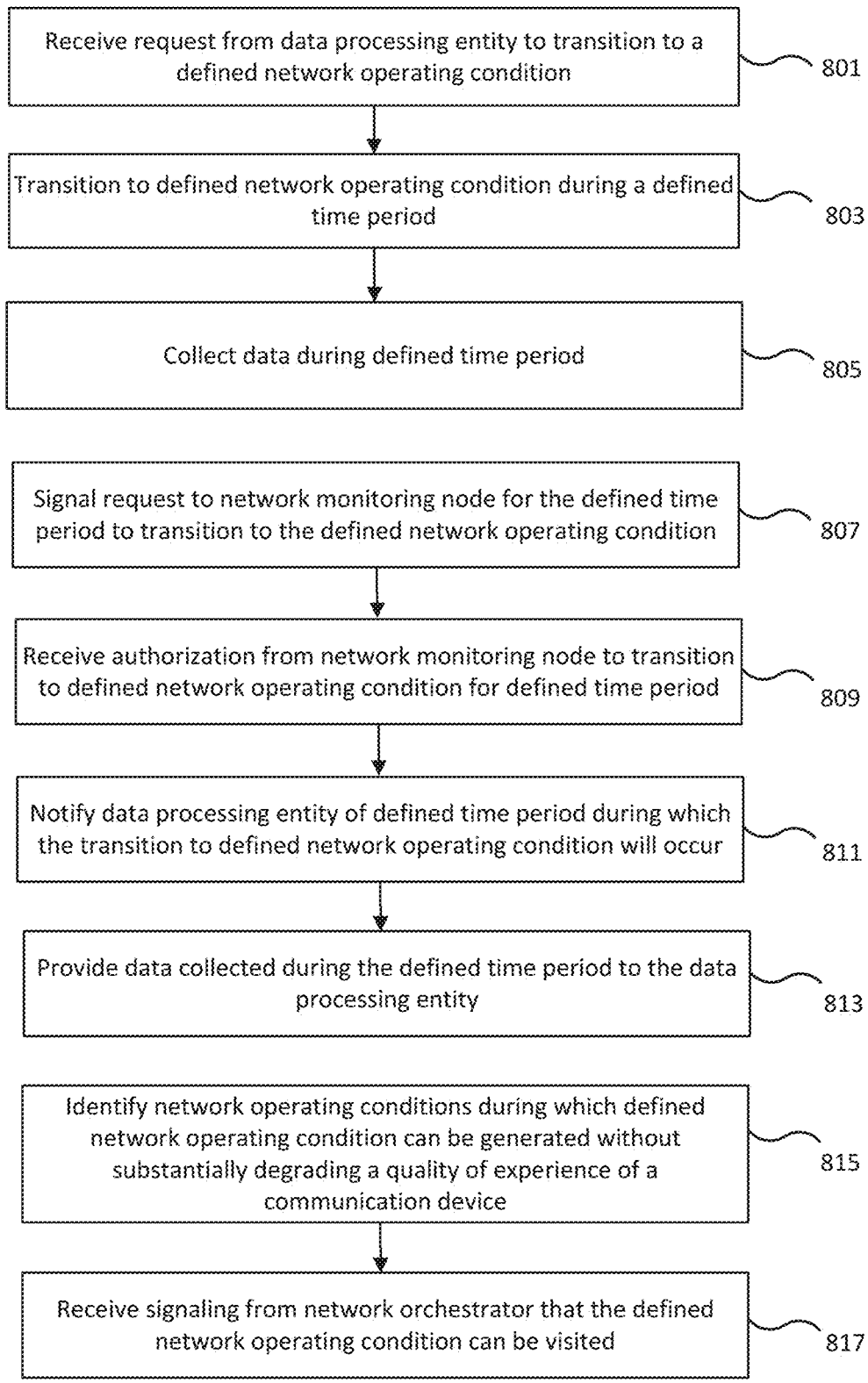
FIG. 8 is a flowchart of operations that are performed by an application programming interface for a network node in accordance with various embodiments of the present disclosure.

Referring initially to FIG. 8, computer implemented operations are performed by an APIR for a network node (e.g., APIR 42 for network node 40 in FIG. 1, implemented using the structure of 400a or 400b of FIGS. 4a and 4b, respectively).

In various embodiments, operations that are performed by the APIR for a network node can include receiving (801) a request from a data processing entity (44) to transition to a defined network operating condition in the radio access network. The operations can further include transitioning (803) to the defined network operating condition during a defined time period. The operations can further include collecting (805) data during the defined time period including at least one observation of the defined network operating condition, an action in the radio access network during the defined network operating condition, and a subsequent observation of the radio access network based on the action.

In some embodiments, the transitioning (803) to the defined network operating condition includes at least one of: a change to a configuration parameter in the network node, or an execution of a procedure to trigger a change in an operating condition for a communication device or the radio access network.

In some embodiments, the execution of a procedure to trigger a change in an operating condition for a communication device or the radio access network includes at least one of: adding distortion at a transmitter of the network node; and generating interference using MU-MIMO scheduling.

In some embodiments, the change to a configuration parameter in the network node comprises tuning the configuration parameter based on at least one condition of the radio access network, wherein the at least one condition comprises at least one of: a traffic load state; a signal to noise ratio; a quality of a reference signal; and an interference state.

In some embodiments, further operations that are performed by the application programming interface for a network node include an operator parameter that can be varied by an operator to alter an environment of the radio access network.

In some embodiments, further operations that are performed by the application programming interface for a network node include signaling (807) a request to a network monitoring node (60) for the defined time period to transition to the defined network operating condition. Further operations include receiving (809) authorization from the network monitoring node to transition to the defined network operating condition for the defined time period. Further operations include notifying (811) the data processing entity of the defined time period during which the transition to the defined network operating condition will occur.

In some embodiments, further operations that are performed by the application programming interface for a network node include providing (813) the data collected during the defined time period to the data processing entity.

In some embodiments, further operations that are performed by the application programming interface for a network node include identifying (815) network operating conditions during which the defined network operating condition can be generated without substantially degrading a quality of experience of a communication device.

In some embodiments, the identifying (815) is based on identifying the defined time period corresponding to when a low-level network controller can have degraded performance that is not substantially visible to a higher-level network controller.

In some embodiments, further operations that are performed by the application programming interface for a network node include receiving (817) signaling from a network orchestrator that the defined network operating condition can be visited.

In some embodiments, at least one of the receiving (801), the transitioning (803), the collecting (805), and the identifying (815) are performed via a network layer.

Various operations from the flow chart of FIG. 8 may be optional with respect to some embodiments of an APIR for a network node and related methods. For example, operations of blocks 807-817 of FIG. 8 may be optional.

Figure 9:
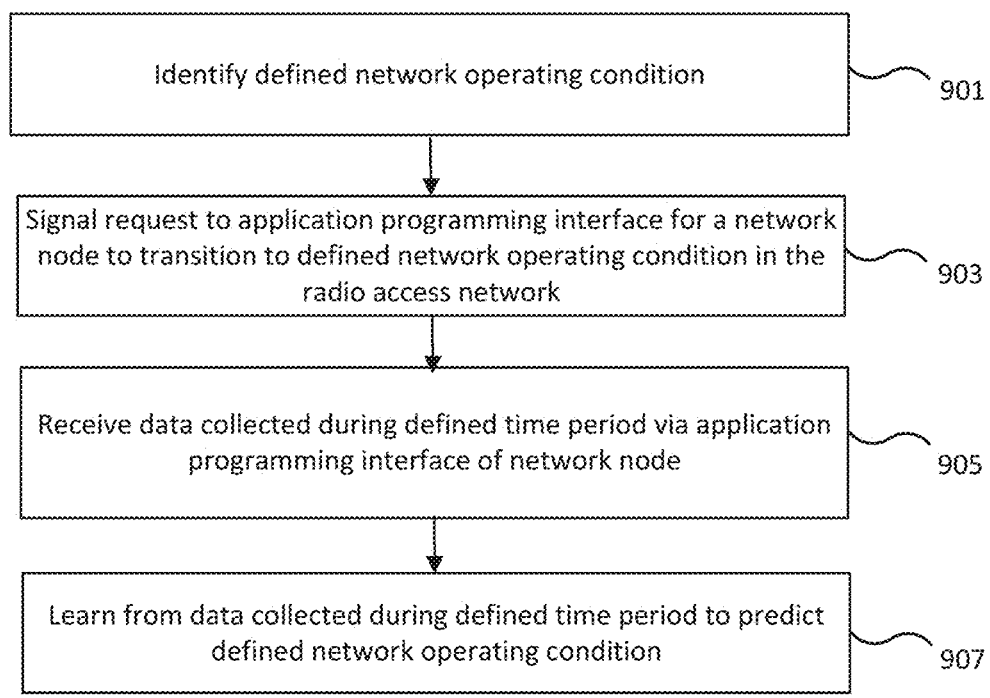
FIG. 9 is a flowchart of operations that are performed by a data processing entity for a network node in accordance with various embodiments of the present disclosure.

Referring next to FIG. 9, computer implemented operations are performed by a DPE for a network node (e.g., DPE 44 in FIG. 1, implemented using the structure of 400a or 500 of FIGS. 4 and 5, respectively).

In various embodiments, operations that are performed by the DPE for a network node can include identifying (901) a defined network operating condition. The operations can further include signaling (903) a request to an application programming interface (e.g., 42) for a network node (e.g., 40) to transition to a defined network operating condition in the radio access network. The operations can further includes receiving (905) data collected during a defined time period via the application programming interface (e.g., 42) of the network node (e.g., 40).

In some embodiments, the defined time period corresponds to period when a low-level network controller can have degraded performance that is not substantially visible to a higher-level network controller.

In some embodiments, the identifying (901) a defined network operating condition includes at least one of: identifying the defined network operating condition from a histogram comprising the defined operating condition; and identifying the defined network operating condition based on using anomaly detection to identify the defined network operating condition in a dataset accessible to the data processing entity.

In some embodiments, the identifying (901) the defined network operating condition includes at least one of: detecting that the defined network operating condition is absent in the dataset; using knowledge from other deployments of a frequency of the defined network operating condition in the dataset; and computing a confidence interval on an estimate of a target function of the defined network operating condition from the dataset.

In some embodiments, at least the identifying (901), the signaling (903), and the receiving (905) are performed via a network layer.

In some embodiments, the defined network operating condition is identified based on the data processing entity predicting a future network operating condition; and the defined time period includes an adjustable time period based on an amount of time needed for transitioning to the predicted future network operating condition.

In some embodiments, further operations that are performed by a data processing entity for a network node include learning (907) from the data collected during the defined time period to predict the defined network operating condition.

Various operations from the flow chart of FIG. 9 may be optional with respect to some embodiments of a DPE for a network node and related methods. For example, operations of blocks 907 of FIG. 9 may be optional.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Claims are provided below. Reference numbers/letters are provided in parenthesis by way of example/illustration without limiting example embodiments to particular elements indicated by reference numbers/letters.

The invention claimed is:

1. A computer implemented method performed by an application programming interface for a network node in a radio access network, the method comprising:
    receiving a request from a data processing entity to transition to a defined network operating condition in the radio access network;
    transitioning to the defined network operating condition during a defined time period; and
    collecting data during the defined time period comprising at least one observation of the defined network operating condition, an action in the radio access network during the defined network operating condition, and a subsequent observation of the radio access network based on the action.

2. The method of claim 1, wherein the transitioning to the defined network operating condition comprises at least one of: a change to a configuration parameter in the network node, or an execution of a procedure to trigger a change in an operating condition for a communication device or the radio access network.

3. The method of claim 2, wherein the execution of a procedure to trigger a change in an operating condition for a communication device or the radio access network comprises at least one of: adding distortion at a transmitter of the network node; and generating interference using MU-MIMO scheduling.

4. The method of claim 2, wherein the change to a configuration parameter in the network node comprises tuning the configuration parameter based on at least one condition of the radio access network, wherein the at least one condition comprises at least one of:
    a traffic load state;
    a signal to noise ratio;
    a quality of a reference signal; and
    an interference state.

5. The method of claim 1, further comprising an operator parameter that can be varied by an operator to alter an environment of the radio access network.

6. The method of claim 1, further comprising:
    signaling a request to a network monitoring node for the defined time period to transition to the defined network operating condition;
    receiving authorization from the network monitoring node to transition to the defined network operating condition for the defined time period; and
    notifying the data processing entity of the defined time period during which the transition to the defined network operating condition will occur.

7. The method of claim 1, further comprising:
    providing the data collected during the defined time period to the data processing entity.

8. The method of claim 1, further comprising:
    identifying network operating conditions during which the defined network operating condition can be generated without substantially degrading a quality of experience of a communication device.

9. The method of claim 8, wherein the identifying is based on identifying the defined time period corresponding to when a low-level network controller can have degraded performance that is not substantially visible to a higher-level network controller.

10. The method of claim 1, further comprising:
    receiving signaling from a network orchestrator that the defined network operating condition can be visited.

11. A computer implemented method performed by a data processing entity for a network node in a radio access network, the method comprising:
    identifying a defined network operating condition;
    signaling a request to an application programming interface for a network node to transition to a defined network operating condition in the radio access network; and
    receiving data collected during a defined time period via the application programming interface of the network node.

12. The method of claim 11, wherein the defined time period corresponds to period when a low-level network controller can have degraded performance that is not substantially visible to a higher-level network controller.

13. The method of claim 11, wherein the identifying a defined network operating condition comprises at least one of:
    identifying the defined network operating condition from a histogram comprising the defined operating condition; and
    identifying the defined network operating condition based on using anomaly detection to identify the defined network operating condition in a dataset accessible to the data processing entity.

14. The method of claim 13, wherein the identifying the defined network operating condition comprises at least one of:
    detecting that the defined network operating condition is absent in the dataset;
    using knowledge from other deployments of a frequency of the defined network operating condition in the dataset; and
    computing a confidence interval on an estimate of a target function of the defined network operating condition from the dataset.

15. The method of claim 11, wherein the defined network operating condition is identified based on the data processing entity predicting a future network operating condition; and wherein the defined time period comprises an adjustable time period based on an amount of time needed for transitioning to the predicted future network operating condition.

16. The method of claim 11, further comprising;
learning from the data collected during the defined time period to predict the defined network operating condition.

17. An application programming interface for a network node in a radio access network comprising:
- at least one processor;
- at least one memory connected to the at least one processor and storing program code that is executed by the at least one processor to perform operations comprising:
  - receiving a request from a data processing entity to transition to a defined network operating condition in the radio access network;
  - transitioning to the defined network operating condition during a defined time period; and
  - collecting data during the defined time period comprising at least one observation of the defined network operating condition, an action in the radio access network during the defined network operating condition, and a subsequent observation of the radio access network based on the action, and additionally, optionally, to perform operations according to claim 2.

18. A non-transitory computer readable medium comprising program code to be executed by processing circuitry of an application programming interface for a network node, whereby execution of the program code causes the application programming interface to perform operations comprising:
- receiving a request from a data processing entity to transition to a defined network operating condition in the radio access network;
- transitioning to the defined network operating condition during a defined time period; and
- collecting data during the defined time period comprising at least one observation of the defined network operating condition, an action in the radio access network during the defined network operating condition, and a subsequent observation of the radio access network based on the action, whereby execution of the program code additionally, optionally, causes the application programming interface to perform operations according to claim 2.

19. A data processing entity for a network node in a radio access network comprising:
- at least one processor;
- at least one memory connected to the at least one processor and storing program code that is executed by the at least one processor to perform operations comprising:
  - identifying a defined network operating condition;
  - signaling a request to an application programming interface for a network node to transition to a defined network operating condition in the radio access network; and
  - receiving data collected during a defined time period via the application programming interface of the network node, and additionally, optionally, perform operations according to claim 11.

20. A non-transitory computer readable medium comprising program code to be executed by processing circuitry of data processing entity for a network node, whereby execution of the program code causes the data processing entity to perform operations comprising:
- identifying a defined network operating condition;
- signaling a request to an application programming interface for a network node to transition to a defined network operating condition in the radio access network; and
- receiving data collected during a defined time period via the application programming interface of the network node, whereby execution of the program code additionally, optionally, causes the data processing entity to perform operations according to claim 11.

* * * * *